United States Patent
Sun et al.

(10) Patent No.: US 8,161,552 B1
(45) Date of Patent: Apr. 17, 2012

(54) WHITE LIST CREATION IN BEHAVIOR MONITORING SYSTEM

(75) Inventors: Chih Yao Sun, Zhonghe (TW); Yi Lu, Nanjing (CN); Dibin Tang, Nanjing (CN); Ruifeng Yang, Nanjing (CN); Peng Shu, Nanjing (CN); Rong Yang, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 324 days.

(21) Appl. No.: 12/565,585

(22) Filed: Sep. 23, 2009

(51) Int. Cl.
*G06F 11/00* (2006.01)
(52) U.S. Cl. ............ 726/22; 726/26
(58) Field of Classification Search ........ 726/22, 726/23, 24, 25, 26; 713/188
See application file for complete search history.

(56) References Cited

U.S. PATENT DOCUMENTS

| | | |
|---|---|---|
| 7,487,543 B2 | 2/2009 | Arnold et al. |
| 7,529,384 B2 * | 5/2009 | Subbalakshmi et al. ...... 382/100 |
| 2007/0250927 A1 * | 10/2007 | Naik et al. .......... 726/22 |
| 2008/0189787 A1 | 8/2008 | Arnold et al. |
| 2009/0046708 A1 * | 2/2009 | Koziol .......... 370/360 |
| 2009/0070878 A1 * | 3/2009 | Wang et al. ...... 726/24 |
| 2009/0083852 A1 * | 3/2009 | Kuo et al. ........ 726/22 |

OTHER PUBLICATIONS

Moskovitch, Robert, Elovici, Yuval and Rokach, Lior; "Detection of unknown computer worms based on behavioral classification of the host"; Computational Statistics & Data Analysis; vol. 52, Issue 9 May 2008. pp. 4544-4566.
Schechter, Stuart E., Jung, Jaeyeon and Berger, Arthur W.; "Fast Detection of Scanning Worm Infections"; Harvard University, U.S. A.

* cited by examiner

*Primary Examiner* — Samson Lemma
(74) *Attorney, Agent, or Firm* — Beyer Law Group LLP

(57) ABSTRACT

A white list (or exception list) for a behavior monitoring system for detecting unknown malware on a computing device is maintained automatically without human intervention. A white list contains process IDs and other data relating to processes that are determined to be (or very likely be) free of malware. If a process is on this list, the rule matching operations of a conventional behavior monitor are not performed, thereby saving processing resources on the computing device. When a process start up is detected, the behavior monitor performs a series of checks or tests. If the process has all valid digital signatures and is not launched from a removable storage device (such as a USB key) and is not enabled to make any inbound or outbound connections, it is eligible for being on the white list. The white list is also automatically maintained by removing process IDs for processes that have terminated or which attempt to make a new outbound or inbound connection, such as a TCP/UDP connection. Scheduled integrity checks on the white list are also performed by examining the process stack for each process to ensure that there are no abnormal files in the process stack.

19 Claims, 9 Drawing Sheets

WHITE LIST CREATION IN BEHAVIOR MONITORING SYSTEM

BACKGROUND OF THE INVENTION

1. Field of the Invention

The present invention relates generally to computing devices and software for malware protection. More specifically, it relates to maintaining white lists for behavior monitoring applications on computing devices.

2. Description of the Related Art

Behavior monitoring is a critical function in many malware detection systems that are used for preventing harmful computer software from damaging computers and corrupting the data stored on them. Recently, Host-based Intrusion Detection Systems ("HIDS"), also known as behavior monitors, have been used to protect against unknown malware, such as new viruses or worms which do not have known "signatures" that can be checked. With behavior monitors the behavior of processes running on a computer is checked to determine if any of the behavior is characteristic of malware or has features that indicate that it may be malware. Behavior monitoring typically requires that a process go through an entire rule matching engine, where a process is compared against a large set of rules, to see if the process is potentially dangerous. For example, the behavior of a process such as which files it opens, in what order, which operations are performed with which files, and the like is examined. Some processes, such as compiling source code, may require so much behavior monitoring that the entire operation of a computer may come to a halt or shutdown. In other examples, copying a file or making a network connection may take a few seconds longer because of the rule matching that occurs in behavior monitoring, which is often a sufficient length of time to cause some annoyance or frustration to the user and make a negative impact.

As such, checking the behavior of nearly all processes on a computer often results in a serious performance issue on the computer. This performance impact often slows down all operations on the computer. In addition, behavior monitors that have a high detection rate may be accompanied with an increased number of false positives. However, performance overhead may be reduced with the use of exception lists, also referred to as white lists. These lists describe features and characteristics of files and processes that, if present, strongly indicate that the processes or files are very likely not malware. Many white lists are created manually by human beings based on what they experience "in the field." This manual creation and maintenance of a white list requires constant changing and updating. Some white lists only exempt a narrow category of processes from being analyzed by a behavior monitoring system, such as only files that have a digital signature from Microsoft. Other examples are task managers or Microsoft processes. These white list entries are typically "hard coded" by a human being. A false positive in this context is a process that is harmless or safe but has been labeled by a behavior monitoring system as potential malware and, as a result, has been prevented from executing. Obviously, the more false positives there are, the more frustrating it is for the computer user, which compounds the performance overhead issue (that is, the computer is not only slow, but also the user is actually prevented from carrying out certain everyday or other normal operations).

It may also be noted that previous work in machine learning and data for detecting malware, worms in particular, include *Fast Detection of Scanning Worm Infection* at Harvard University. This research describes approaches that are effective for known worms (and those unknown worms with similar network behaviors) by hypothesis test algorithm. In this approach, web crawling penetration is still a significant issue, as is performance. Another research project is the *Detection of Unknown Computer Worms Activity Based on Computer Behavior using Data Mining* at Ben-Gurion University in Israel. The results of this research indicate a high accuracy rate on average with 20 detection categories. By increasing detection categories, the data mining can increase accuracy and the lower false positive rate. However, it may also imply that more system power needs to be input for the detection function and overall performance impact could be a concern.

The following patent and patent applications describe a fundamental mechanism for behavior monitoring. They both use system-wise monitoring and, inevitably, have performance concerns. They are: "Method and Apparatus for the Automatic Determination of Potentially Worm-Like Behavior of a Program," U.S. Pat. No. 7,487,543, Arnold; William C., et al, assigned to IBM Corporation and "Method and Apparatus for the Automatic Determination of Potentially Worm-Like Behavior of a Program," US Patent Application Publication No. 20080189787, Arnold; William C., et al. assigned to IBM Corporation.

It would be desirable to have a behavior monitor that does not seriously impact performance on a computer. It would also be desirable if the monitor does not needlessly prevent users from executing safe programs or tasks, and at the same time offers adequate protection from unknown and new malware.

SUMMARY OF THE INVENTION

In one embodiment, methods of maintaining a white list for use in a behavior monitor system are described. The behavior monitor has a driver module and a service module used for detecting known and unknown malware on a computing device. A white list is a list of process identifiers corresponding to processes that are determined to be safe or highly unlikely to be the result of or to propagate malware on the device. These processes are exempt from the computational and resource-intensive operations of rule matching by the behavior monitor. Embodiments of the present invention provide ways of automatically placing and removing processes from the white list without requiring manual maintenance (including insertion of processes) of the white list by a human operator.

A behavior monitor detects the execution or start up of a process. The monitor determines whether the process has a valid digital signature. If it does not, the process is not eligible for the white list. If it does, it may then determine whether the process is being launched from a removable storage device. If it is, it is not eligible for being on the list. If the process is not launched from a removable device, such as a USB key, a third criterion is checked, namely, whether the process is enabled to make an inbound connection, also referred to as a listening port. If it is able to make an inbound connection, then the process is ineligible for placement on the white list. If it is not able to make an inbound connection from an external entity, the behavior monitor checks whether the process is able to make an outbound connection. That is, can the process initiate a connection from the computing device to an external entity or component. If it cannot, then the process has passed all four criteria and is automatically placed on the white list, without any human (i.e., manual) intervention or operations needed. In one embodiment, the four criteria described are of equal relevance and may be checked in any suitable order. The order described above is simply one embodiment. Furthermore, in other embodiments, a process may only need to pass three, two or one of the criteria described in order to be placed on the white list or have to pass a specific two of the criteria (e.g., no inbound or outbound connections enabled) and only one of the other two, and the like.

In other embodiments, when a new connection is attempted by a process, this connection attempt is communicated to the behavior monitor and the process identifiers is obtained. The monitor checks whether the process ID is on the white list. If it is, the process ID is removed from the list, since it can no longer be presumed that the process is safe. If a process is terminated, the behavior monitor is informed of the termination and checks whether the process is on the white list. If it is, the process ID is automatically removed from the list. In another embodiment, a process is analyzed in order to obtain a process stack corresponding to the process. It is then determined whether the process stack contains any abnormal files or any files that normally would not be in a process stack. Files that are normally in a process stack are .dll and .exe files. If the process stack has files that are unusual, the corresponding process ID is removed from the white list. In one embodiment, if the process stack is normal, the digital signatures of the files in the stack are checked and only after passing this additional check, is the process allowed to stay on the white list.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Methods and systems for automatically creating an exception list, also referred to as a "white list," for use in a behavior monitor system on a computing device for detecting malware are described in the various figures. Most behavior monitors use a white list to reduce the amount of processing required by the monitoring system to detect unknown malware. For a behavior monitor to be effective, essentially all events and the processes that trigger them need to be analyzed, that is, they are processed by a rule engine to check whether the process is potential malware. However, this creates significant runtime overhead because each process goes through what may be described as a rule-matching decision tree. However, if a process ID is in a white list, then it does not have to be analyzed by the monitoring service as discussed below. A process is typically placed on a white list if it has at least one specific characteristic or property.

If a process is on a white list, it considered to be safe or very likely to be safe (i.e., it does not contain malware) and is not put through the rule matching process of the behavior monitoring system. As noted above, a common example of a white list criterion is a process that deals only with files that have valid digital signatures. If a process has a file or invokes a file that has a digital signature from a reliable source (e.g., Microsoft, Oracle, and the like), then the process is presumed to be authentic and safe. Another example is if the process is a task manager. It is highly unlikely that a process is potentially malware if the process is a task manager. A white list reduces the processing load of behavior monitors by identifying processes that are highly unlikely to be any type of unknown malware by exempting them from the computationally intensive rule matching operations. Known malware is often checked using virus signatures and other techniques not relevant to the present invention.

Figure 1:
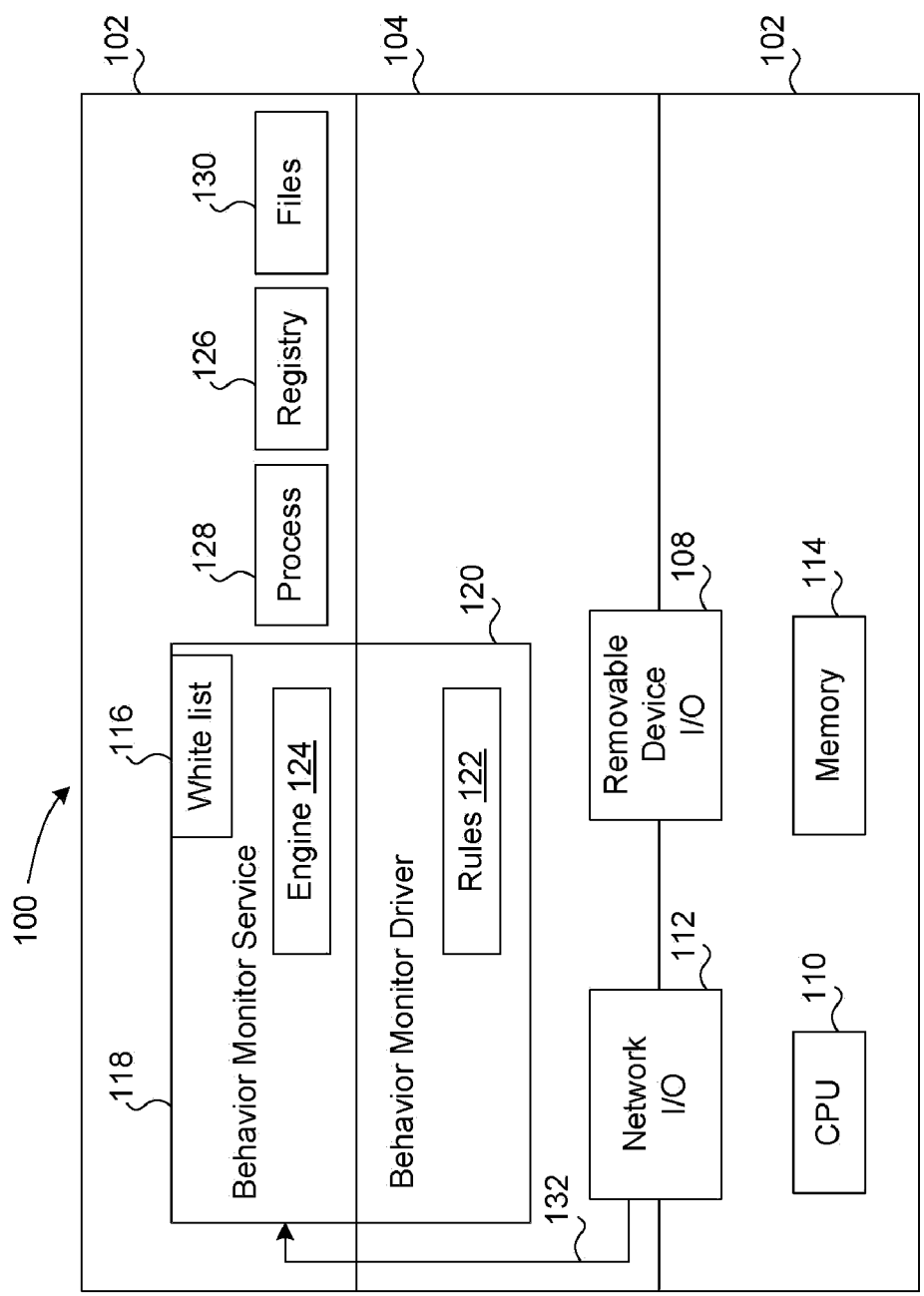
FIG. 1 is a block diagram of a computing device, such as a computer (desktop, laptop, netbook, server, and the like), or a "smart" handset device such as a cell phone, in accordance with one embodiment.

FIG. 1 is a block diagram of a computing device, such as a computer (desktop, laptop, netbook, server, and the like), or a "smart" handset device such as a cell phone, in accordance with one embodiment. A computing device 100 is shown as having a hardware platform 102, a "kernel mode" 104, and a "user mode" 106. Other terms may be used to describe, for example, kernel mode 104 and user mode 106, depending on the type of computing device (e.g., server computer vs. cell phone). Computing device 100 has various hardware components: CPU 110, memory 114, which can be any type of suitable memory, such as, RAM, ROM, cache, non-volatile or volatile memory, and the like, a network interface component 112, and an I/O component 108 for interfacing with removable devices. Some of these components operate or have some functionality in kernel mode 104, which can be described as a layer that operates directly "above" hardware platform 102 (i.e., bare machine components). Network interface component 112 and removable device I/O 108 have software functionality or firmware that operates in kernel 104, thus, a portion of each module is shown in kernel 104.

FIG. 1 shows major components of a behavior monitoring system: a driver 120 and a monitoring service 118. The primary purpose of monitoring service 118 ("service") is to function as a rules engine, manage a white list 116 and provide rules 122 to driver 120. Monitoring server 118 operates in user mode 102. White list 116 and rules 122 are stored in memory 114 but are shown in service 118 to more clearly represent the association. Monitoring service 118 also performs other functions, such as monitoring TCP/UDP connection status for currently executing processes (similar to tCP-View.exe from Microsoft Sysinternals). Service 118 executes a rules matching engine 124 that uses rules 122 stored in a rules database in memory 114. As noted, also stored in memory 114 is white list 116.

Behavior monitor driver 120 operates in kernel mode 104. Driver 120 "hooks" all process calls 128, registry calls 126 and file operations 130. In one embodiment, there is a communication line or data transmission connection 132 between monitoring service 118 and network I/O component 112. When driver 120 detects that a process call 128, a registry call 126 or a file operation or event 130 is initiating or starting up, it initiates a method described in FIG. 2 below.

Figure 2:
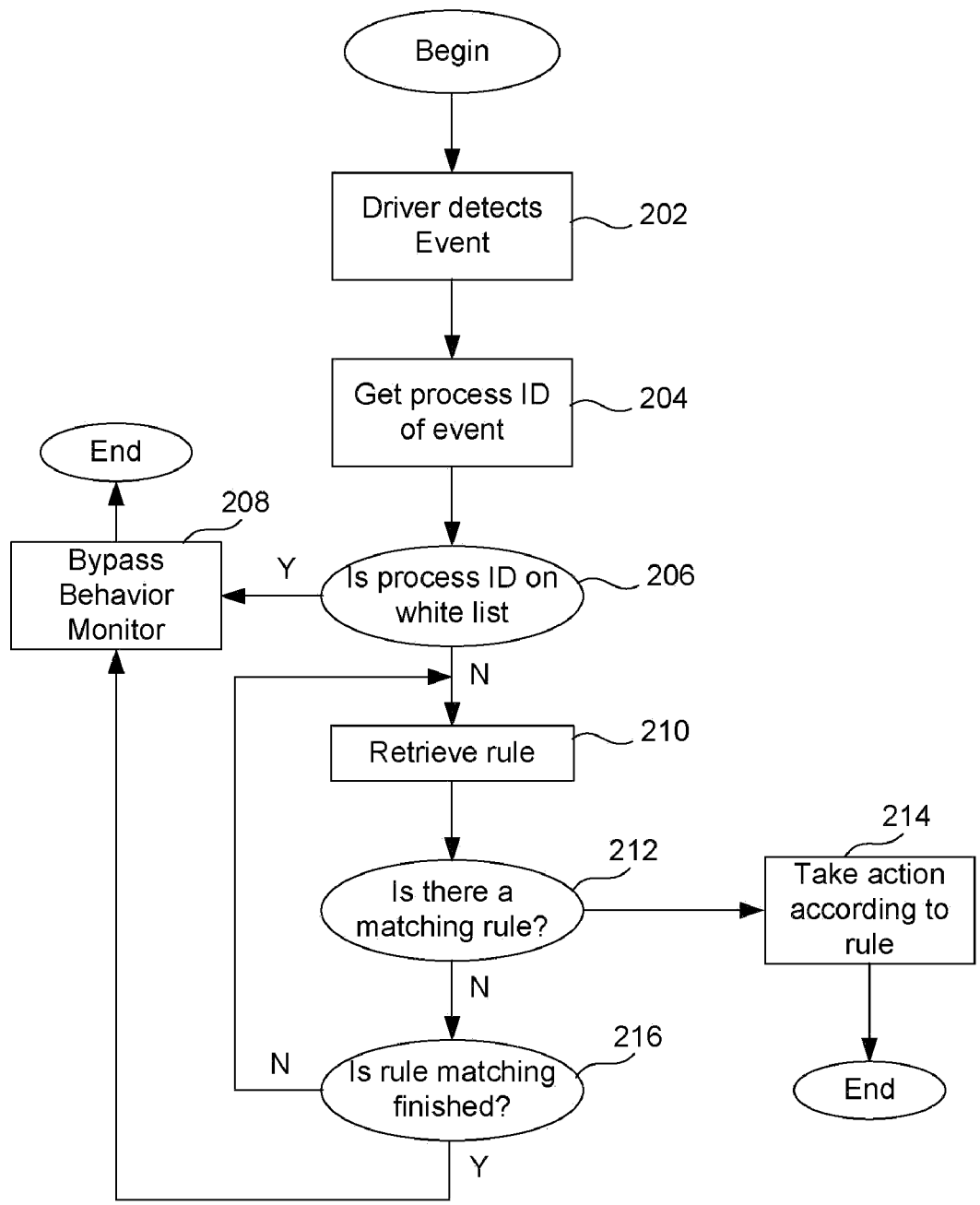
FIG. 2 is a flow diagram of a process that occurs in a behavior monitoring system operating in a computing device in accordance with one embodiment.

FIG. 2 is a flow diagram of a process that occurs in a behavior monitoring system operating in a computing device in accordance with one embodiment. As shown in FIG. 1, a behavior monitoring system may be comprised of service 118 and driver 120. At step 202 the behavior monitor driver detects an event in the computing device. It may be a file operation or a call to a register or a call to a process registry. Driver 120 (or an equivalent component) of a host-based intrusion detection system (the behavior monitoring system) performs this "detection" function. At step 204 the driver obtains the ID of the process that triggered the event detected at step 202.

At step 206 the monitoring service checks to see if the process ID is on a white list maintained by the behavior monitor system. If it is, control goes to step 208 where further processing by the behavior monitor is bypassed, specifically, the rule-matching decision tree is bypassed. The behavior monitor does not have to perform any other functions with respect to the event detected at step 202 and there is no further processing overhead at runtime. FIGS. 3 to 7 below describe the automated maintenance of this white list and ways of ensuring that once a process ID is placed on white list, the process corresponding to this ID continues to be considered safe qualifying it to stay on the list.

If the process ID is not on the white list, control goes to step 210 where a rule is retrieved by the monitoring service from a rules database. At step 212 it is determined whether there is a matching rule to the rule retrieved at step 210. If there is a matching rule, control goes to step 214 where an action is taken according to the matching rule. This is intended to block or appropriately deal with the event which is likely the result of unknown malware. The behavior monitor has determined that the event qualifies as some type of suspicious behavior and that some action should be taken to prevent malware infection. If there is no matching rule at step 212, control goes to step 216 where it is determined whether the rule matching has completed. If it has, control goes to step 208 where further processing by the behavior monitor is bypassed. If the rule matching is not finished, control goes to step 210 where the next rule is retrieved.

Rule matching in a behavior monitor (operating in the Microsoft OS) may be described using Table 1. Assume that the end user defines "services.exe," and "rundll32.exe" as trusted process ("ProcessTrusted"). Note that these processes are not in white list 206. Assume that malware injects a "threat agent" named "crack123.exe". Below are "use cases" to explain how rule-matching works. These use cases illustrate steps 210-212-216 in FIG. 2.

TABLE 1

| No | Subject resource | Type of subject process | Action |
| --- | --- | --- | --- |
| 1 | HKEY_LOCAL_MACHINE\SOFT WARE\Microsoft\Windows NT\CurrentVersion\Drivers | ProcessTrusted | Pass |
| 2 | HKEY_LOCAL_MACHINE\SOFT WARE\Microsoft\Windows NT\CurrentVersion\Drivers | ProcessAny | Deny |
| 3 | C:\Windows\System32\drivers\*.* | ProcessTrusted | Pass |
| 4 | C:\Windows\System32\drivers\*.* | ProcessAny | Deny |
| 5 | Undefined | ProcessAny | Pass |

The following is one scenario or use case illustrating use of Table 1. When "services.exe" (a trusted process) attempts to access "HKEY_LOCAL_MACHINE\SOFTWARE\Microsoft\Windows NT\CurrentVersion\Drivers," the behavior monitor detects this action in kernel mode, and sends this action and action owner's information to the rule-matching engine. This occurs at step 210; at this stage, a trusted process (ProcessTrusted) still has to enter the rule-matching engine. In the rule, step 212, it is determined that this action matches rule No. 1 because the "Subject resource" ("HKEY_LOCAL_MACHINE . . . \Drivers") is identical to what services.exe is attempting to access. Because "services.exe" is a known "ProcessTrusted," rule-matching engine passes this action and control goes to step 208 where further monitoring is bypassed.

In another example, assume "crack123.exe" attempts to modify "C:\Windows\System32\drivers\keyboard.sys" for key logger injection. The behavior monitor detects this action in kernel mode and sends the action and action owner's information to the rule-matching engine. In the matching procedure, this action matches Rule No. 3 because the "Subject resource" is identical. However, since "crack123.exe" is not a "ProcessTrusted," this action does not match Rule No. 3 in its entirety, so the rule-matching engine moves to Rule No. 4. However, this action does match the "Subject resource" in Rule No. 4 and "crack123.exe" fall in the category of "ProcessAny" process. Finally, the rule-matching engine decides to Deny this action and the matching process is complete. Based on the rule-matching result, behavior monitor will block any file modification executed by "crack123.exe."

In another example or use case, "johndoe.exe" attempts to modify "C:\My Document\todolist.doc." Behavior monitor detects this action in kernel mode and sends this action and action owner's information to the rule matching engine. In the matching procedure, this file modification action does not match Rules No. 1 to 4 because the "Subject resource" entries are not the same as "C:\My Document\todolistdoc". Eventually, it matches Rule No. 5 and the rule-matching engine issues a "Pass." This action by "johndoe.exe" runs the entire rule-matching journey and, at the end, bypasses the behavior monitor; that is, nothing is done to it.

It is worth noting that most processes are like "johndoe.exe." They are innocent or harmless processes but require significant processing by the behavior monitor and, thereby, have a negative performance impact on the computing device. The figures below describe methods of automatically placing processes like "johndoe.exe" on a white list. It is also helpful to note at this point that a process in a white list implies that the behavior monitor trusts this process unconditionally. Regardless of what the process does, the final action is always "Pass". Therefore, as long as a process is on the white list, it will not enter the rule-matching procedure and the performance impact is minimized. A process defined as "ProcessTrusted," as this term is used above, means that the behavior monitor trusts it, but with conditions. These conditions are listed in rule lists (an example of which is shown in Table 1). This rule list must be checked and, thus, its performance overhead is inevitable.

Figure 3A:
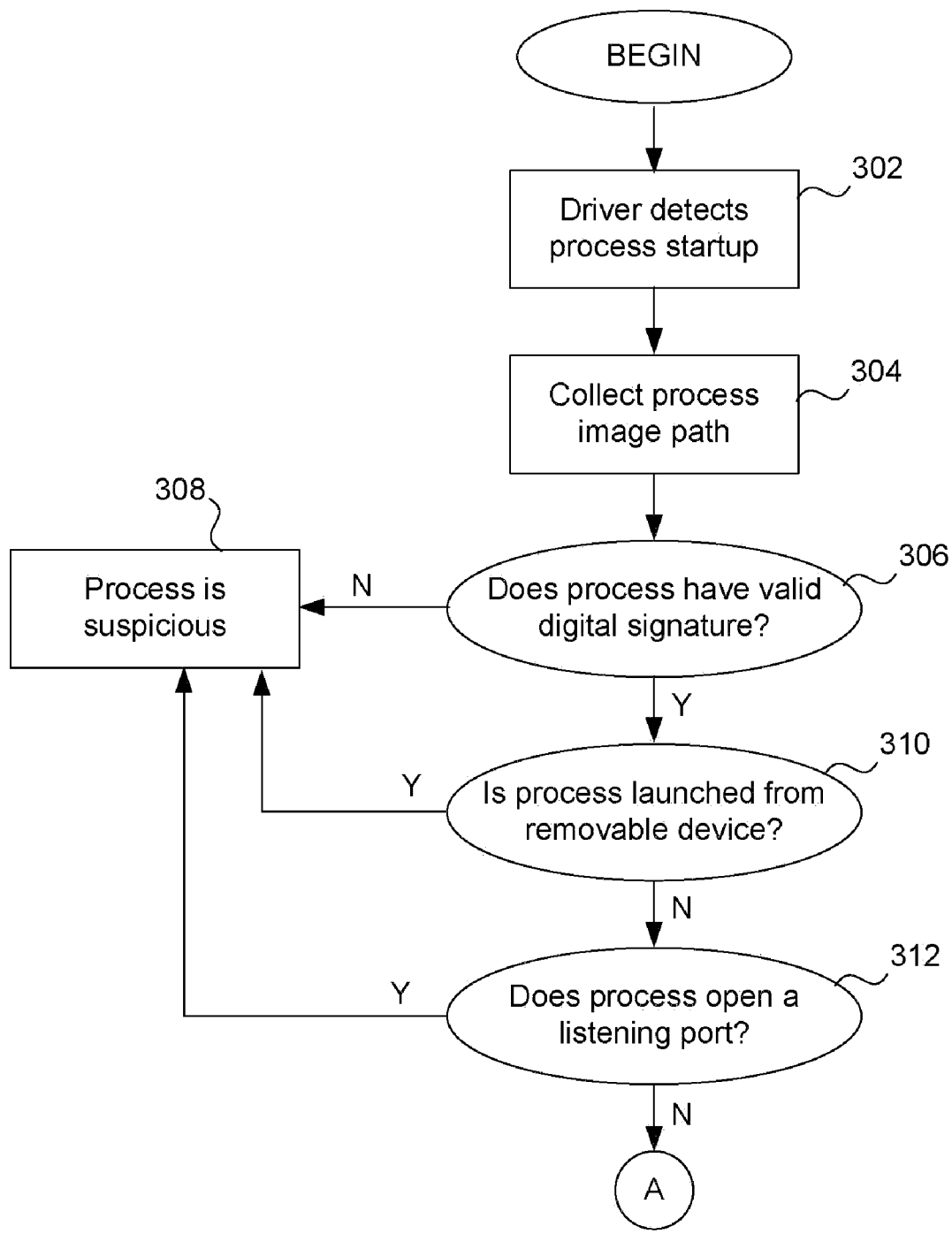
FIG. 3 is a flow diagram of a process for automatically creating a white list in accordance with one embodiment.
Figure 3B:
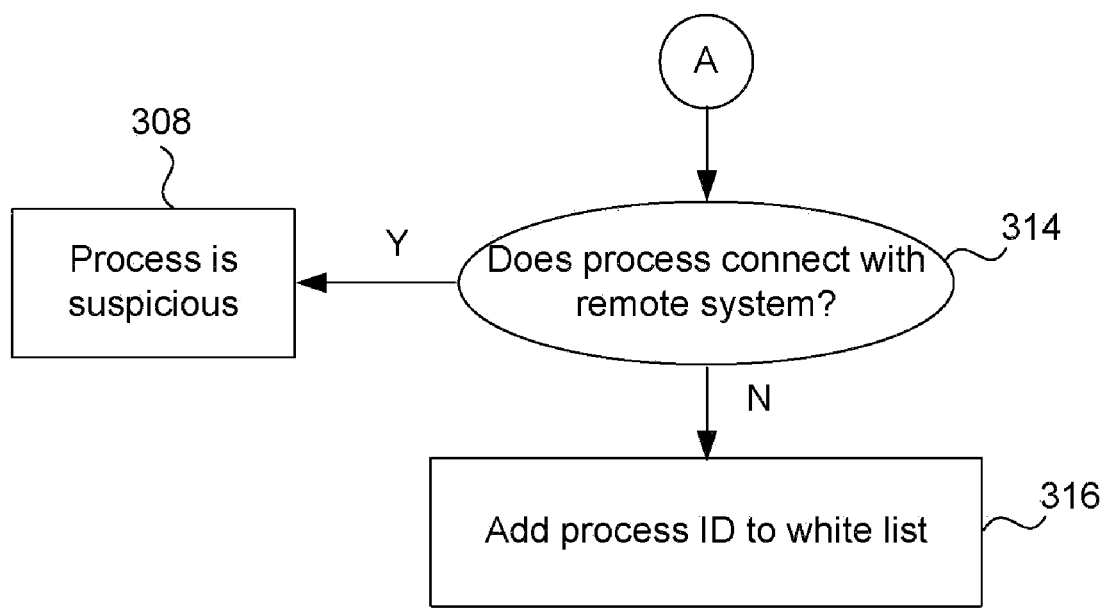

FIG. 3 is a flow diagram of a process for automatically creating a white list in accordance with one embodiment. It is helpful to note that by analyzing malware behavior, it is possible to discern their primary propagation and penetration methods with respect to a target. For example, it has been learned that communication and networking-capable modules, such as Windows Remote Procedure Call (Rcomputer) or Internet Explorer (IE), are frequent targets of malware. When exploiting these modules for deceiving end users, often the first action taken by new malware is on such targets using methods such as phishing (or pharming) scams. It has also been learned by examining actual data and statistics from the field that "auto-play" from USB memory devices and other portable memory devices are sources of attacks from local sources.

At step 302 a behavior monitor driver, operating in the kernel mode of a device, detects that a process is starting up or initiating in the computing device. An event or an event may trigger a process. An event which triggers a process may be 1) a call to a registry (e.g., Windows registry), 2) a hook to a network or to a file, 3) a call to a process pool, or 4) performing an operation on a file. A process initiated in a computing device is assigned a process ID and is typically triggered by an event.

At step 304 the behavior monitor driver collects or obtains an image path for the process that triggered the event. An example of an image path is "\??\C:\Windows\system32\driver\kb.sys" or "\??\H:\tools\abc.exe". The "\??\C:\" and "\??\H:" portions are drive IDs. The kernel is able to determine from the drive ID whether the running process is executed (or launched) from a fixed hard drive or is executed from a removable drive. As is known in the field, every running application process comes from a file and this file must have a file path. In kernel mode, this file path is named "Image Path". The system kernel knows each drive's attributes, for example, it knows Drive C is a hard drive, Drive E is a DVD-ROM and Drive H is a USB memory stick.

At step 306 the driver determines whether the files, programs, and other software associated with the process have valid digital signatures. Many software vendors attach digital signatures on their files and processes. Digital signatures ensure authenticity and integrity of a process, software, files, and so on. If a file has a valid digital signature, its source can be verified and authenticated. Most legitimate software vendors provide digital signatures for their software. If they do not or if a file does not have a valid digital signature, generally it should not be trusted and the process associated with the file should be deemed a suspicious process. For example, the Vista operating system from Microsoft enforces that vendors sign their binary files. If the file or other software has a valid digital signature, control goes to step 310. If the file/software does not have a digital signature, then control goes to step 308 and the process is deemed suspicious in that it may originate from potential malware. Thus, the process is not eligible for being on the white list of the behavior monitoring system. The process then goes through the rule matching steps of FIG. 2 (steps 210 to 216).

At step 310, the second of four factors in automatically placing a process on a white list is examined. In one embodiment, at this step the driver determines whether the process was initiated or launched from an external or removable device, such as a USB key, a CD-ROM drive, DVD drive, memory card, or other portable device (typically, a storage device but not necessarily so) from which a process may be launched from an external source. In all these cases, the process is coming from an external, often unknown, source. Referring to FIG. 1, an external device, such as a USB key, may interface with removable device input/output component 108. If the process is launched from a removable device, control goes to step 308. In this case, the process is considered suspicious because it originated from a removable device. As mentioned, in many cases, malware is launched from USB auto-play. If it is determined by the driver that the process was not launched from a removable storage device, the process remains eligible for being placed on the white list and a second factor is examined.

At step 312 it is determined whether the process is open to connections from a remote source. That is, whether the process has an open listening port, also referred to as an input port. If it does, the process may be communicating over a network connection with an external source, such as over the Internet, a VPN, or a LAN. In this case, the process may have an inbound connection from the external source and, thus, may be rated suspicious because it may enable an inbound connection which may be used to receive malware. Of course, this does not mean that all processes originating from a removable source or that enable an inbound connection (or originate from a removable source) are dangerous, it simply means they are not presumed to be sufficiently safe at the outset to be placed on a white list. If the process enables an inbound connection to the computing device, control goes to step 308. If it does not have an inbound connection, control goes to step 314.

At step 314 the driver determines whether the process is able to connect to a remote system on a network, that is, whether there is a potential outbound connection. Any process that is able or has functionality for connecting or communicating with an external entity and has the capability of transferring confidential data to an unknown source on a network. Having an outbound connection increases the possibility that the process may cause damage to the computer. If there is an outbound connection, the process is assumed to be suspicious and control goes to step 308.

If the process does not have an outbound connection or the ability to make an outbound connection to a remote system, in one embodiment, the process has passed a set of criteria and the process ID is automatically placed on the behavior monitor's white list in step 316. Consequently, the next time the process is encountered in the normal operation of the computing device, the behavior monitor avoids unnecessary and resource-intensive rule-matching operations. In one embodiment, a process must pass all tests above to be placed on the white list. For example, a Windows Live Messenger process (msnmsgr.exe) may pass step 306 and step 310 but may fail to pass step 312 because it opens a listening port for remoter request. In this case, it goes directly to step 308 and it does not have to do the test at step 314. In other embodiments, fewer or more tests may be used to determine whether a process should be automatically inserted into the white list.

In the described embodiment, in order to be considered a presumably safe process, a process must be a standalone, native process with no capability of connecting to an external device or entity, or being communicated with by an external device. Examples of such processes are a compiler (e.g., cl.exe) or a linker program (e.g., link.exe). Examples of processes that would not be automatically placed on the list include Rcomputer processes, such as svchost.exe or iexplor.exe. These are suspicious because both are connectable from a remote system, even though both have valid digital signatures or are not transferred from a removable device. In another example, if Acrobat Reader, acro32.exe, which has a valid digital signature and does not communicate with external entities, for example, does not have a listening port or an outbound connection, but is installed on the computing device from a USB key or other type removable storage device, then it is not automatically placed on the white list. As noted, in other embodiments, other criteria or tests may be used.

Figure 4:
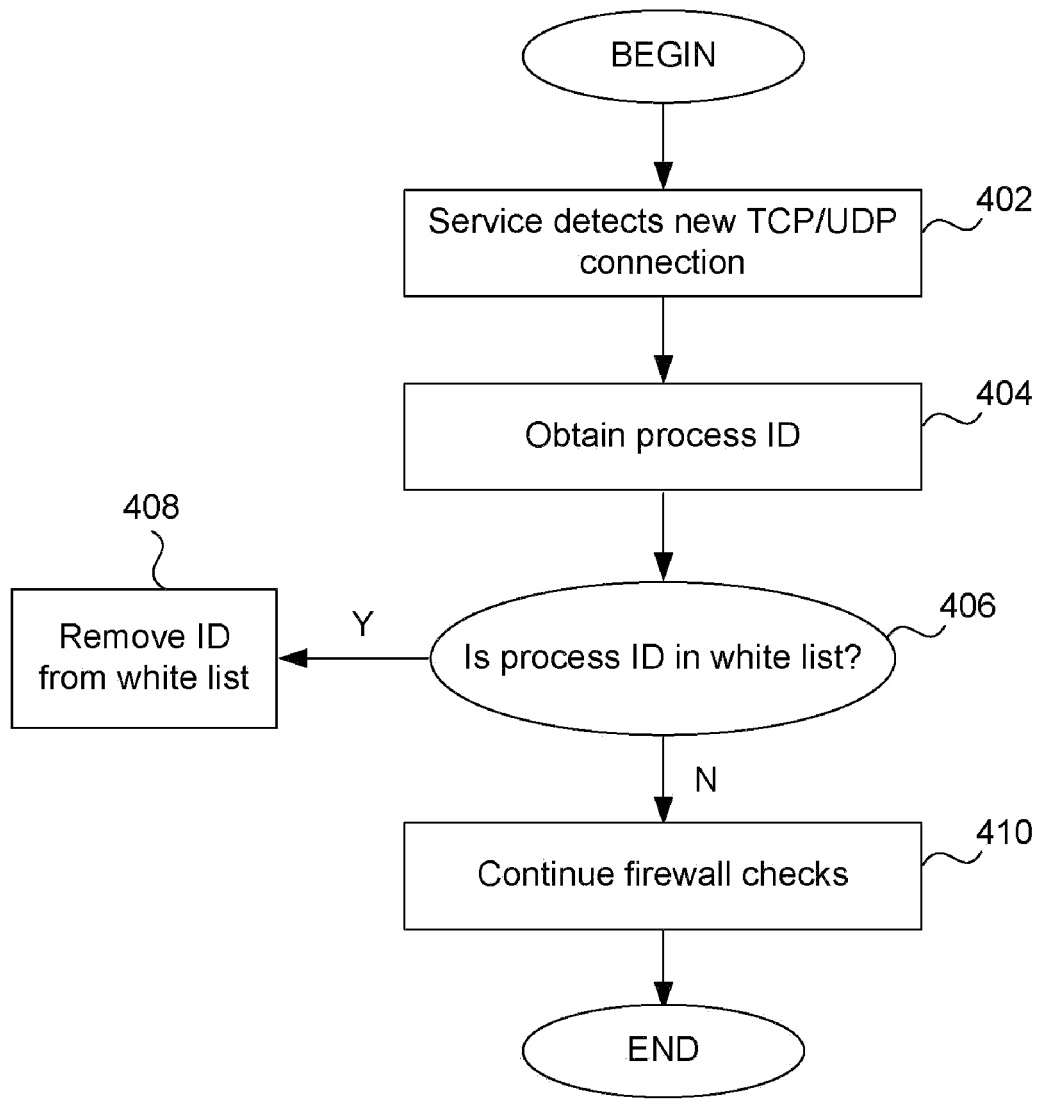
FIG. 4 is a flow diagram of a process of ensuring that processes, which have been automatically placed on the white list, do not subsequently attempt to initiate a new outbound connection, specifically a new TCP/UDP connection.

FIG. 4 is a flow diagram of a process of ensuring that processes, which have been automatically placed on the white list, do not subsequently attempt to initiate a new outbound connection, specifically a new TCP/UDP connection. This is done to ensure the purity of the white list and that processes maintain their "safe" status. It is possible that after a process is on the white list, it may attempt to make an outbound connection even though at the time it was initially examined, it was not making an outbound connection. By making or attempting to make such a connection now, the presumption that it is not trying to import malware is no longer valid.

At step 402 the behavior monitoring system learns that a new TCP/UDP connection is being made. Specifically, the service is informed, via connection 128, by network I/O component 112 that the computer is making an outbound connection. In many computing systems, network I/O component 112 is responsible for all external network connections with the device. The connection that is attempted is made by a connection owner, essentially a process. At step 404 the service obtains the process ID for this process. At this stage the behavior monitoring system does not know whether the process ID is on the white list. At step 406 the behavior monitor service determines whether the process ID is on the white list. An example of a white list is shown in Table 2. In one embodiment, it consists of four columns: Process ID, Process Name, Process Image Path, and Integrity Check Status. If the process is on the white list, control goes to step 408 where the process ID is removed from the list. The behavior monitoring service instructs the driver to take the process ID off the list. In one embodiment, the ID is not put back on even if the network connection is somehow disabled or removed. By attempting to make an outbound connection when during the initial check it was not attempting such a connection, the process can no longer be presumed safe and may be seen as more suspicious than if an outbound connection was detected in the initial check. If the process is not in the white list at step 410, firewall or other security checks are performed as may normally be done on the computer on any outbound connection, such as a new TCP/UDP.

TABLE 2

| Process ID | Process Name | Process Image Path |
| --- | --- | --- |
| 3321 | cl.exe | C:\Program Files\Microsoft Visual Studio 8\VC\bin\cl.exe |
| 1389 | link.exe | C:\Program Files\Microsoft Visual Studio 8\VC\bin\link.exe |
| 3621 | Lib.exe | C:\Program Files\Microsoft Visual Studio 8\VC\bin\lib.exe |
| 2122 | Nmake.exe | C:\Program Files\Microsoft Visual Studio 8\VC\bin\namke.exe |

Figure 5:
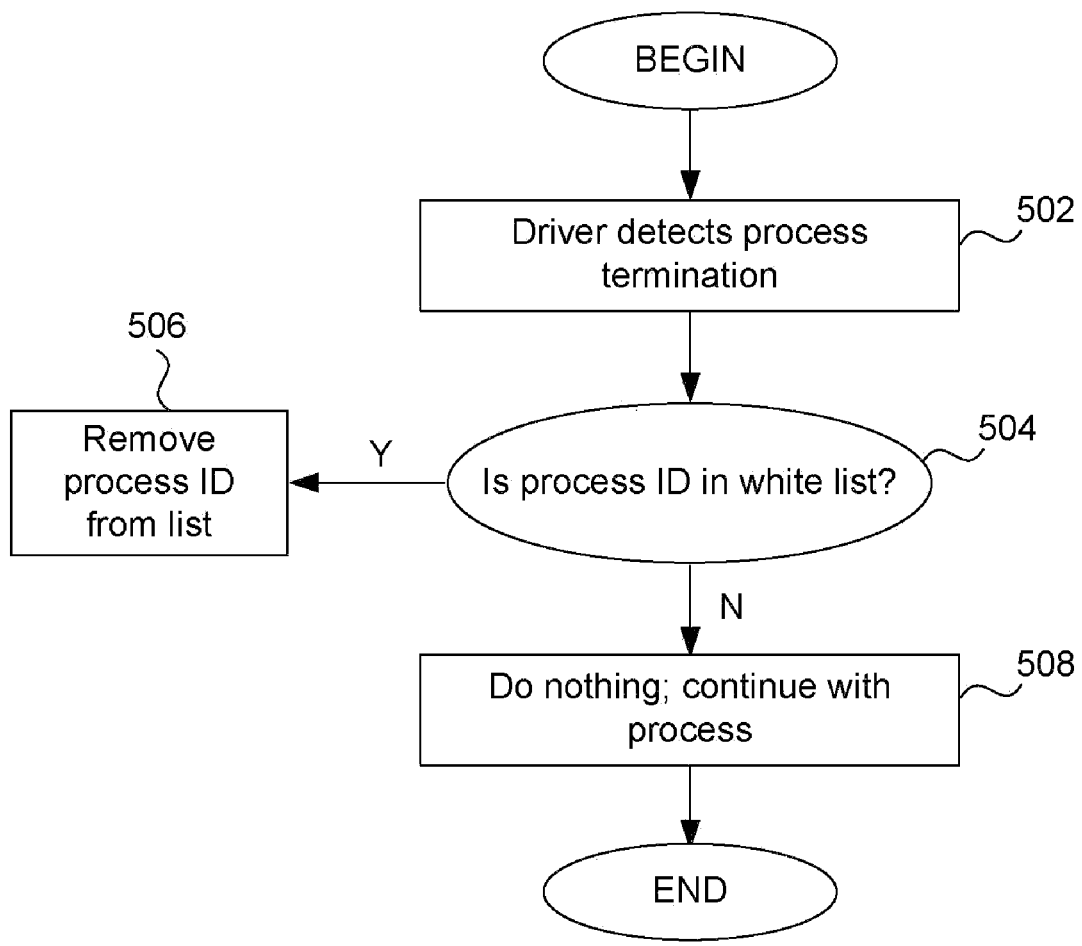
FIG. 5 is a flow diagram of a method of removing a process from a white list upon process termination in accordance with one embodiment.

FIG. 5 is a flow diagram of a method of removing a process from a white list upon process termination in accordance with one embodiment. At step 502 the behavior monitor driver which operates in the kernel detects that a process has terminated. A process terminates when an event is complete. A behavior monitor has API hook ability. With this ability, a behavior monitor is able to detect any API call executed by specific processes. This ability is critical in detecting process startup and termination. When a process terminates itself gracefully (that is, by not crashing), it calls an API named ExitProcess( ) (or a similar function) to notify the operating system to cleanup all resources occupied by the process. If the behavior monitor detects ExtProcess( ) API called by a specific process, it knows the process is going to shutdown.

At step 504 the behavior monitor service determines whether the process ID is in the white list. If it is, at step 506 the behavior monitor removes the process ID is removed from the list. If the process is not on the list, at step 508 the behavior monitoring driver continues normal execution and performs no other operations with respect to the terminated process. In this manner, the behavior monitoring system maintains the white list by keeping it free of expired or terminated process IDs that are no longer relevant and preventing the white list from continuously growing.

Figure 6:
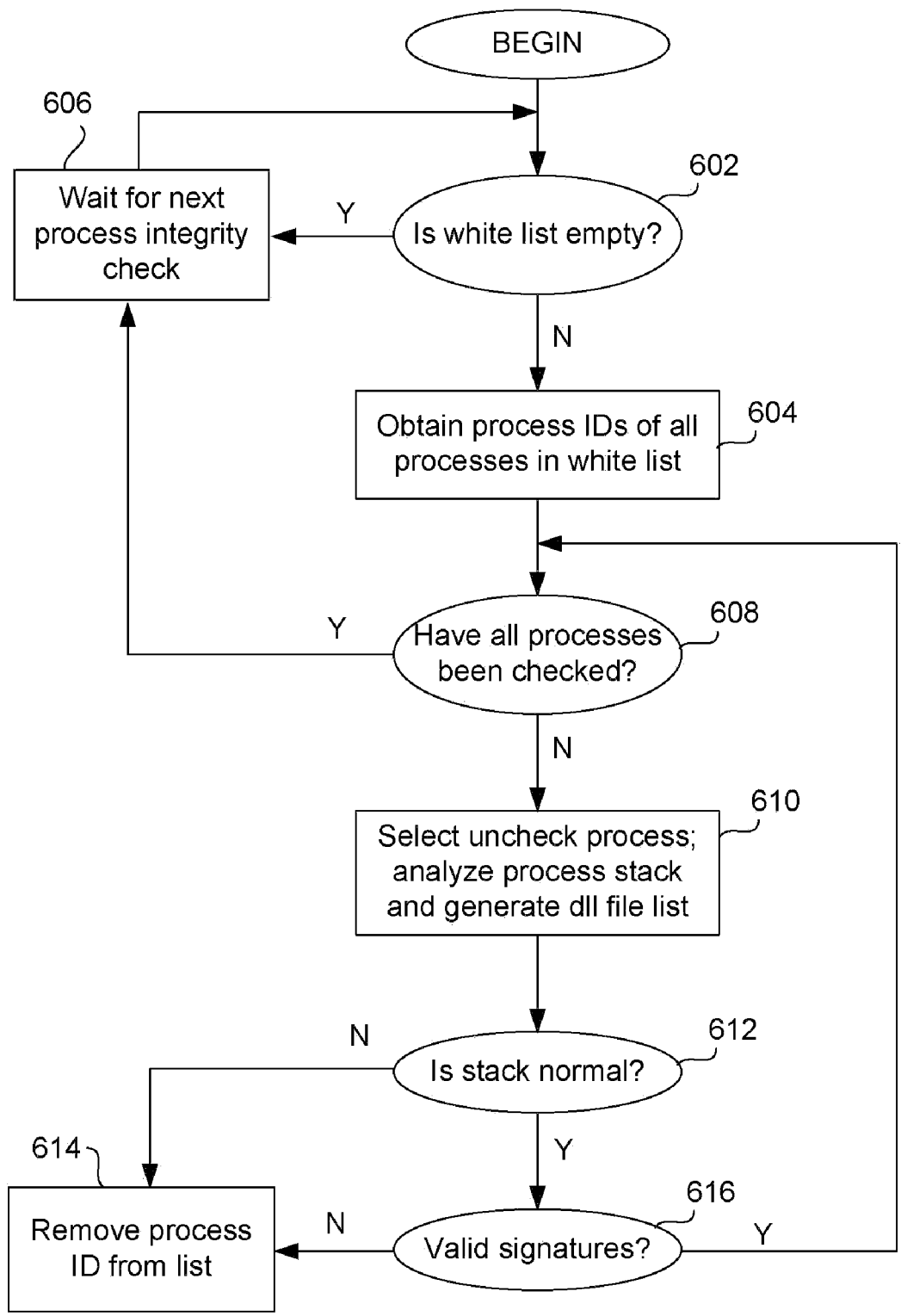
FIG. 6 is a flow diagram of a process for checking the integrity of a process in accordance with one embodiment.
Figure 7:
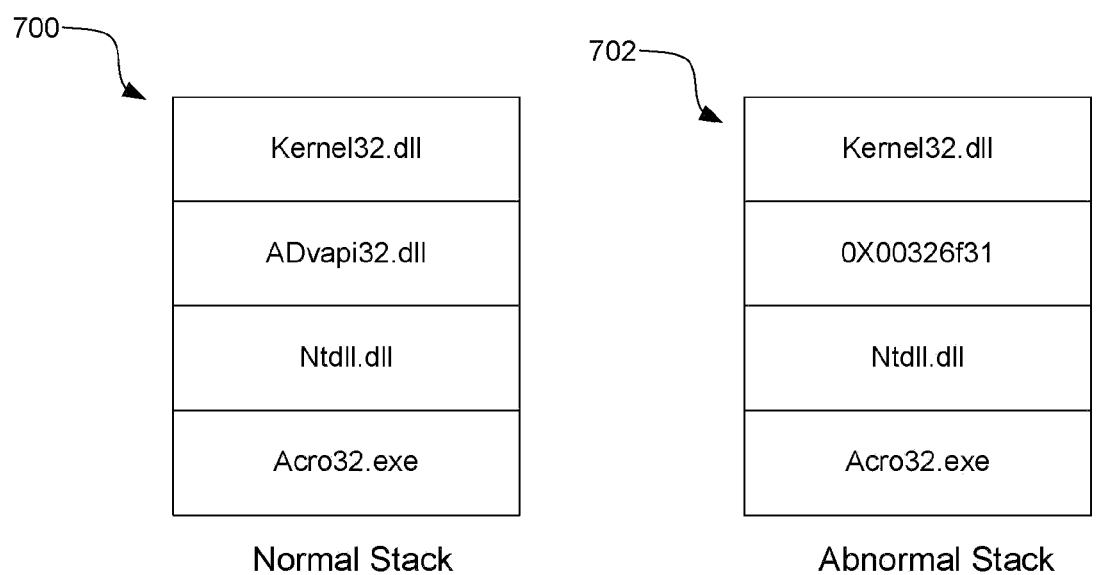
FIG. 7 shows two examples of a process file stack.

FIG. 6 is a flow diagram of a process for checking the integrity of a process in accordance with one embodiment. This integrity check may be done according to a preset schedule (i.e., by a timer) in the behavior monitoring service. In one embodiment, the actual check is executed by the driver. At step 602 the driver determines whether the white list is empty. If it is not empty, control goes to step 604. If it is empty, control goes to step 606 where the driver waits for the next scheduled process integrity check. At step 608 the driver determines whether all the processes have been checked. This may be done by examining an integrity check flag in the process record in the white list as shown in Table 2. If they have, control goes to step 606. If not, an unchecked process from the white list is selected at step 610. Each process has a process stack stored in memory. For the unchecked process, the driver analyzes the process stack. In doing so, the driver analyzes the process stack for the unchecked process and generates a dynamic link library (dll) file stack. At step 612 the driver determines whether the stack has any files that indicate an abnormal file stack, which may be symptomatic of a malware attack. A normal stack has files that are either dynamic link library (.DLL) files or executable files (.EXE). As example is shown in FIG. 7. Stack 700 is a normal stack and has Acro32.exe file (or another executable file), an Ntdll.dll file, an ADvapi32.dll file, and a Kernel32.dll file. These are all normal files, most of which will typically be dll files. The behavior monitor driver is able to identify or recognize a normal stack created by a process by ensuring they are all .dll or .exe files. FIG. 7 shows an abnormal stack 702 which may have a file such as "0x00326f31" in it or another file not having a .dll or .exe extension. Such a stack indicates that the process from which it was generated may be malware or harmful in some respect. If the stack does not have only normal (conventional) .dll or executable files, it is considered abnormal and potentially harmful and, at step 614 the process is removed from the white list. If normal, control goes to step 616 where the driver checks to see whether each file has a valid digital signature. If at least one file in the stack does not, the process ID is removed from the white list at step 614. This digital signature check is performed as an extra security measure. In other embodiments, this digital signature check need not be performed.

Figure 8A:
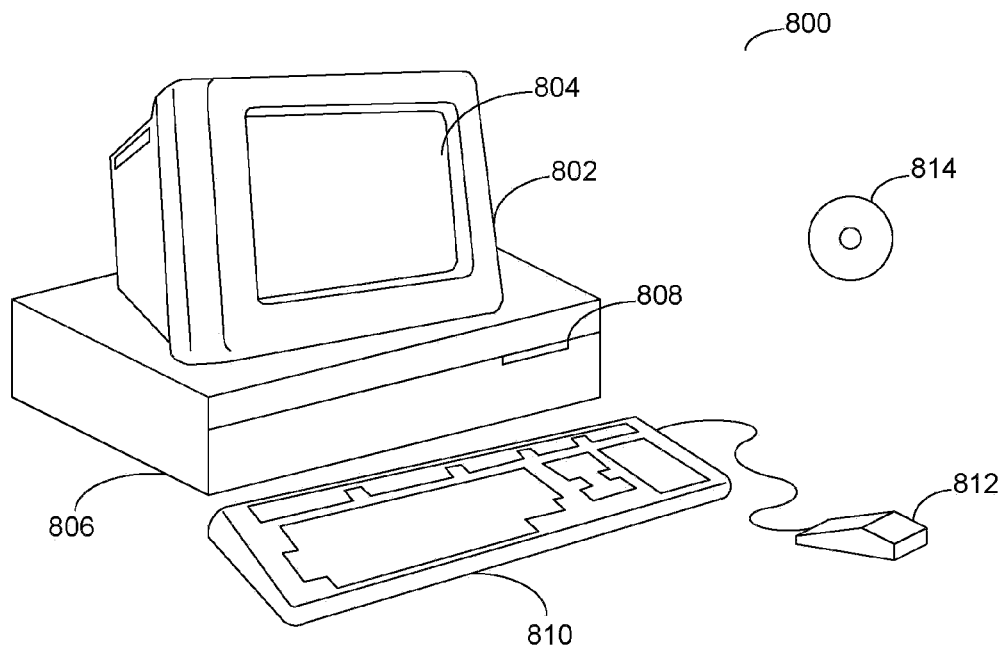
FIGS. 8A and 8B are block diagrams of a computer system suitable for implementing embodiments of the present invention.
Figure 8B:
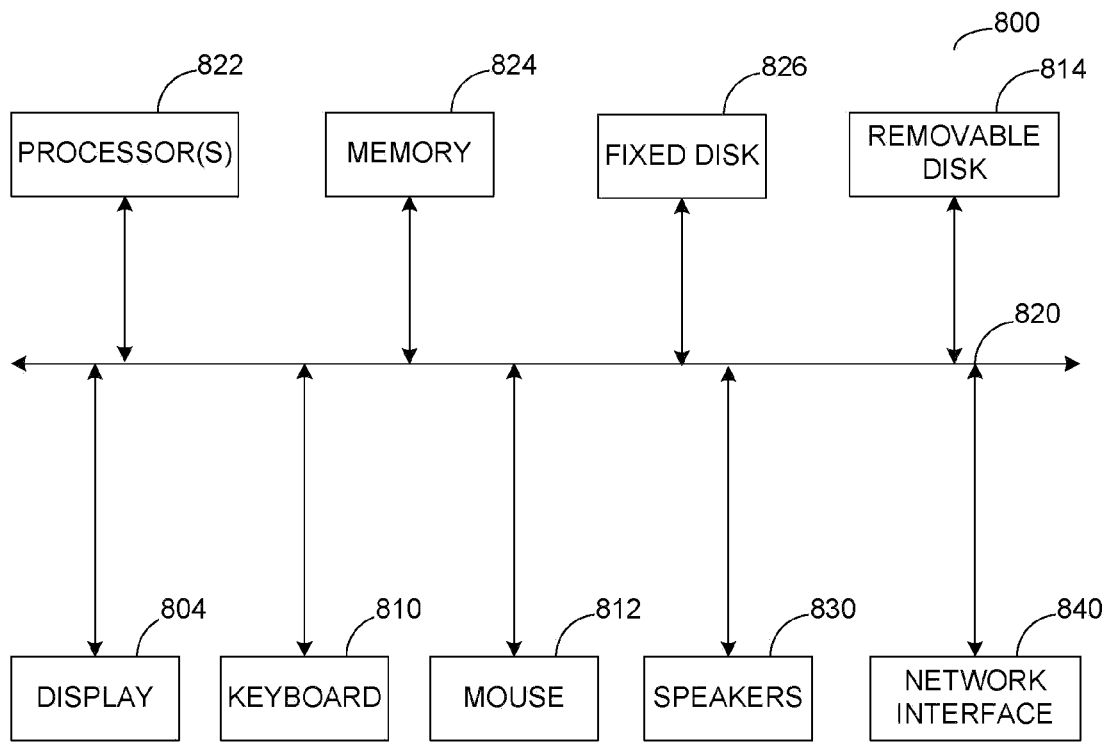

FIGS. 8A and 8B are diagrams of a computer system 800 suitable for implementing embodiments of the present invention. FIG. 8A shows one possible physical form of a computer system or computer as described above. Of course, the computer system may have many physical forms including an integrated circuit, a printed circuit board, a small handheld device (such as a mobile telephone, handset or PDA), a personal computer, a server computer, a laptop or netbook computer, or a super computer. Computer system 800 includes a monitor 802, a display 804, a housing 806, a disk drive 809, a keyboard 810 and a mouse 812. Disk 814 is a computer-readable medium used to transfer data to and from computer system 800. FIG. 8B is an example of a block diagram for computer system 800. Attached to system bus 820 are a wide variety of subsystems. Processor(s) 822 (also referred to as central processing units, or CPUs) are coupled to storage devices including memory 824. Memory 824 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 826 is also coupled bi-directionally to CPU 822; it provides additional data storage capacity and may also include any of the computer-readable media described below. Fixed disk 826 may be used to store programs, data and the like and is typically a secondary storage medium (such as a hard disk) that is slower than primary storage. It will be appreciated that the information retained within fixed disk 826, may, in appropriate cases, be incorporated in standard fashion as virtual memory in memory 824. Removable disk 814 may take the form of any of the computer-readable media described below.

CPU 822 is also coupled to a variety of input/output devices such as display 804, keyboard 810, mouse 812 and speakers 830. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 822 optionally may be coupled to another computer or telecommunications network using network interface 840. With such a network interface, it is contemplated that the CPU might receive information from the network, or might output information to the network in the course of performing the above-described method steps. Furthermore, method embodiments of the present invention may execute solely upon CPU 822 or may execute over a network such as the Internet in conjunction with a remote CPU that shares a In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of maintaining a white list for use in a behavior monitoring system for malware detection executing on a computing device, the method comprising:
    detecting execution of a process;
    determining that the process has a valid digital signature;
    determining that the process is not launched from a removable storage device;
    determining that the process is not enabled to make an inbound connection to the computing device;
    determining that the process is not enabled to make an outbound connection to an external component from the computing device; and
    automatically updating the white list with a process identifier associated with said process, thereby maintaining the white list without human intervention.

2. A method as recited in claim 1 further comprising:
    detecting a new connection being made by the process in the computing device;
    obtaining the process identifier of the process;
    determining that the process identifier is on the white list; and
    removing the process identifier from the white list.

3. A method as recited in claim 2 wherein said detecting is performed by a behavior monitoring service component of the behavior monitor system.

4. A method as recited in claim 2 further comprising:
    receiving notification of the new connection from a network input/output module in the computing device.

5. A method as recited in claim 1 further comprising:
    detecting termination of the process;
    determining that the process identifier for the process is on the white list; and
    removing the process identifier from the white list.

6. A method as recited in claim 1 further comprising:
    analyzing the process to obtain a process stack corresponding to the process;
    determining that the process stack contains abnormal files; and
    removing the process identifier from the list.

7. A method as recited in claim 6 further comprising:
    determining that files in the stack have valid digital signatures; and
    removing the process ID from the white list.

8. A method of maintaining a white list for use in a behavior monitoring system for malware detection executing on a computing device, the method comprising:
    receiving an indication that a process is executing;
    automatically updating the white list with a process identifier associated with said process when it is determined that the process has a valid digital signature and that the process is not launched from a removable storage device and that the process is not enabled to make an inbound connection to the computing device and that the process is not enabled to make an outbound connection to an external component from the computing device; and
    removing the process identifier from the white list when the behavior monitoring system detects a new connection being made by the process.

9. A method as recited in claim 8 further comprising:
    receiving notification of the new connection from a network input/output module in the computing device.

10. A method as recited in claim 8 further comprising:
    receiving an indication that the process is terminating;
    determining that the process identifier for the process is on the white list; and
    removing the process identifier from the white list.

11. A method as recited in claim 8 further comprising:
    analyzing the process to obtain a process stack corresponding to the process;
    determining that the process stack contains an abnormal file; and
    removing the process identifier from the list.

12. A method as recited in claim 11 wherein the abnormal file is not a .ddl file or an .exe file.

13. A method as recited in claim 11 further comprising:
   determining that files in the stack do not have valid digital signatures; and
   removing the process ID from the white list.

14. A method of maintaining a white list for use in a behavior monitoring system for malware detection executing on a computing device, the method comprising:
   detecting execution of a process;
   automatically updating the white list with a process identifier associated with said process when it is determined that the process has a valid digital signature and that the process is not launched from a removable storage device and that the process is not enabled to make an inbound connection to the computing device and that the process is not enabled to make an outbound connection to an external component from the computing device; and
   removing the process identifier from the list when the behavior monitoring system determines that a process stack corresponding to the process contains abnormal files.

15. A method as recited in claim 14 further comprising:
   detecting a new connection being made by the process in the computing device;
   obtaining the process identifier is on the white list; and
   removing the process identifier from the white list.

16. A method as recited in claim 15 wherein said detecting is performed by a behavior monitoring service component of the behavior monitor system.

17. A method as recited in claim 15 further comprising:
   receiving notification of the new connection from a network input/output module in the computing device.

18. A method as recited in claim 14 further comprising:
   detecting termination of the process;
   determining that the process identifier for the process is on the white list; and
   removing the process identifier from the white list.

19. A method as recited in claim 14 further comprising:
   determining that files in the stack have valid digital signatures; and
   removing the process identifier from the white list.

* * * * *